United States Patent Office 3,600,438
Patented Aug. 17, 1971

3,600,438
NITROSO DIFLUORO ACETYL HALIDES AND A METHOD FOR THE PREPARATION THEREOF
Robert A. Falk, Rockaway, N.J., assignor to Thiokol Chemical Corporation, Bristol, Pa.
No Drawing. Filed Nov. 29, 1968, Ser. No. 780,198
Int. Cl. C07c 51/58, 53/20
U.S. Cl. 260—544
4 Claims

ABSTRACT OF THE DISCLOSURE

Compounds represented by the formula $$ONCF_2COX$$

wherein X is fluoro, chloro, or bromo are disclosed. A method for producing these compounds is provided which consists of reacting for example a 1,1,2,2-tetrafluoro-2-nitroso ethyl or lower alkyl ether with $AlCl_3$ in an anhydrous solvent at a temperature from $-10°$ C. to $50°$ C. and recovering nitroso difluoro acetyl chloride and nitroso difluoro acetyl fluoride. The compounds are useful crosslinking monomers for making polymers which are highly resistant to oxidation and corrosion.

---

This invention relates to novel compounds and a method for preparing the same.

With the advent of highly reactive oxidizers, various means have been sought to confine these oxidizers. In general, most polymeric materials and elastomers based thereon do not withstand the reactive oxidizers.

A recent development which has shown considerable promise in solving these problems has been the discovery of nitroso polymers and elastomers. Thus, the advent of carboxy nitroso elastomers has produced a solution for coping with aggressive oxidizers and corrodents. Moreover, the oxidation resistance of some of the crosslinked nitroso polymers is so outstanding that these will not burn in pure oxygen atmosphere. The basic nitroso polymer building blocks are a nitroso monomer and a tetrafluoro ethylene. To introduce crosslinkable groups, various monomers have been used.

In general, the carboxy nitroso polymers are prepared by condensing nitroso trifluoro methane, tetrafluoro ethylene, and as a third monomer, nitroso fluoro ether or a nitroso fluoro carboxylic acid or esters thereof. A monomer from the third group is needed to form elastomers for direct crosslinking or first incorporating an ether or ester group bearing nitroso monomer in the polymer, converting these groups to a carboxylic acid group, and then crosslinking the same. Heretofore, the preparation of the nitroso fluoro carboxylic acid has been via synthesis routes requiring a multitude of costly steps with drastic decrease in yields and/or increase in costs.

It has now been found that nitroso fluoro acetyl halides may be readily prepared circumventing many problems encountered in prior art methods for synthesizing the carboxylic acid bearing nitroso polymer. After incorporation in the polymer, the units based on the nitroso acetyl halide precursor may be directly crosslinked or the acetyl halide group converted to a stable carboxylic acid group.

Nitroso fluoro acetyl halides readily decompose when the same are sought to be hydrolyzed to the free nitroso acetic acid. In fact, the acetyl halide monomers are rather sensitive to moisture. The ready decomposition of a nitroso difluoro acid also explains the failure to prepare this hypothetical monomer. However, if the acetyl halide monomers are incorporated in a nitroso polymer and the acetyl halide moiety then hydrolyzed, the carboxylic acid group may readily be obtained. Thus, a pendant carboxylic group may now be introduced into the polymer backbone in a straightforward manner.

In accordance with the invention, if tetrafluoro ethylene is reacted with an alkali alkoxide, such as sodium methoxide in a manner well known in the art, 1,1,2-trifluoro ethylene alkyl ether is obtained. This precursor, if reacted in turn with nitrosyl halide, such as NOCl, NOBr, NOF, will yield 1-halo-2-nitroso-1,2,2-trifluoro ethyl alkyl ether. This precursor, but most desirably 1,1,2,2-tetrafluoro-2-nitroso ethyl alkyl ether, if treated with aluminum chloride will yield nitroso difluoro acetyl chloride, and in smaller yields, nitroso difluoro acetyl fluoride; both monomers are highly desirable starting compounds.

The following reaction route summarizes the above by an appropriate example:

A. $CF_2=CF_2 + Na\text{-}O\text{-alkyl} \longrightarrow CF_2=CF\text{-}O\text{-alkyl} + NaF$ B. $CF_2=CF_2\text{-}O\text{-alkyl} + NOX \longrightarrow ONCF_2CFX\text{-}O\text{-alkyl}$ C. $ONCF_2CFX\text{-}O\text{-alkyl} \xrightarrow[0°C]{AlCl_3} ONCF_2COCl + ONCF_2COF$ According to the novel process, the starting material for the preparation of the nitroso difluoro halides is of the general formula: $ONCF_2CFX$—O—alkyl wherein alkyl is lower alkyl, i.e., methyl, ethyl, propyl, iso-propyl, butyl, sec-butyl, and t-butyl, as well as pentyl, hexyl, heptyl, and isomers of the last three; and X in the formulae above is a halo moiety such as F, Cl, and Br, of which the fluoro moiety is preferred.

The novel compounds produced from the precursor are of the formulae: $ONCF_2COCl$ and $ONCF_2COF$, and as mentioned before, these monomer compounds are sensitive to moisture.

The reaction is carried out at low temperatures such as $-10°$ C. to $50°$ C. but preferably at about $0°$ C., using aluminum chloride in an anhydrous medium. As the reaction may be exceedingly violent, it is well to moderate it by using aluminum chloride in a solvent such as tetrachloro ethane. The reaction is quite unexpected in that the nitroso moiety is retained in the nitroso difluoro acetyl halide molecule without destroying the same which would be the case if the reaction were to proceed at higher temperatures. Mere traces of moisture decompose the product such as $ONCF_2COCl$ to $COF_2$. Hence, the presence of water should be strongly guarded against. Therefore, the reactants are dried by passing the same in contact with drying agents such as $P_2O_5$.

The following examples depict the above-described invention; however, these examples are offered for the purpose of illustrating the invention and are not to be construed as limiting the broader scope of the disclosed invention.

EXAMPLE 1

A mixture of 30% $ONCF_2CF_2$—O—$C_2H_5$ and balance $ONCF_2CO_2C_2H_5$ was reacted with aluminum chloride at $0°$ C. in a tetrachloro ethane at anhydrous conditions. The ester was present merely as a diluent. Nitroso difluoro acetyl chloride and nitroso difluoro acetyl fluoride were isolated. These compounds were also recovered by gas chromatography and identified by nuclear magnetic resonance spectra. The $F^{19}$ N.M.R. data are as follows:

$ONCF_2COCl \quad \phi^*+103.6 \ (CF_2)$ $ONCF_2COF \quad \phi^*+105.5 \ (CF_2)$ $-29.2 \ (COF)$

EXAMPLE 2

In the same manner as in Example 1, $ONCF_2CF_2$—O—$C_2H_5$ is reacted with $AlCl_3$ in anhydrous tetrachloro ethane.

Both compounds, i.e., ONCF₂COCl and ONCF₂COF are obtained.

What is claimed is:
1. A compound represented by the formula

ONCF₂COX wherein X is fluoro or chloro.
2. The compound according to claim 1 wherein X is fluoro.
3. The compound according to claim 1 wherein X is chloro.
4. A method for preparing nitroso difluoro acetyl fluoride or chloride which comprises reacting a 1,1,2,2-tetrafluoro-2-nitroso ethyl lower alkyl ether wtih AlCl₃ in an anhydrous solvent at a temperature from −10° C. to 50° C. and recovering nitroso difluoro acetyl chloride and nitroso difluoro acetyl fluoride.

References Cited

UNITED STATES PATENTS 3,040,085    6/1962    Andreades _____ 260—466

OTHER REFERENCES

Park et al., Journal Organic Chemistry, vol. 23, pp. 1474 and 5 (1958).

CHARLES B. PARKER, Primary Examiner

E. J. GLEIMAN, Assistant Examiner

U.S. Cl. X.R.

260—80.73, 614